(12) United States Patent
Parkkinen et al.

(10) Patent No.: US 7,835,588 B2
(45) Date of Patent: Nov. 16, 2010

(54) CONTRAST OPTIMIZATION OF IMAGES

(75) Inventors: Jaana Parkkinen, Tampere (FI); Petri Nenonen, Tampere (FI)

(73) Assignee: Nokia Corporation, Espoo (FI)

( * ) Notice: Subject to any disclaimer, the term of this patent is extended or adjusted under 35 U.S.C. 154(b) by 1001 days.

(21) Appl. No.: 11/564,719

(22) Filed: Nov. 29, 2006

(65) Prior Publication Data

US 2008/0123952 A1     May 29, 2008

(51) Int. Cl.
*G06K 9/40* (2006.01)
(52) U.S. Cl. ........................ 382/274; 382/168
(58) Field of Classification Search ............... 348/672; 358/521, 522; 382/168, 169, 170, 171, 172, 382/274; 702/180
See application file for complete search history.

(56) References Cited

U.S. PATENT DOCUMENTS

| | | | |
|---|---|---|---|
| 6,236,751 B1 | 5/2001 | Farrell | |
| 6,915,024 B1 | 7/2005 | Maurer | |
| 2003/0012437 A1* | 1/2003 | Zaklika et al. | 382/169 |
| 2007/0223067 A1* | 9/2007 | Lee et al. | 358/520 |

FOREIGN PATENT DOCUMENTS

EP        0 723 364        7/1996

OTHER PUBLICATIONS

International Search Report from corresponding International Application No. PCT/IB2007/003605 dated Apr. 7, 2008.

* cited by examiner

*Primary Examiner*—Matthew C Bella
*Assistant Examiner*—Gregory F Cunningham
(74) *Attorney, Agent, or Firm*—Banner & Witcoff, Ltd.

(57) ABSTRACT

Aspects of the invention relate to methods and systems for optimizing contrast of digital images and video. Because of the size limitations placed on cameras and sensors that are part of devices, it is common for images to have poor quality. Different images traditionally require different solutions as they exhibit drastically different features. Aspects allow managed control on limiting the stretching strength of a stretching function, thus maintaining the natural appearance of images, tolerable amount of noise enhancement, and contrast reduction on less desirable parts of the image. Further aspects relate to a stretching function presented as one Look Up Table (LUT), thus allowing fast computations on limited computing devices such as consumer electronic devices.

34 Claims, 8 Drawing Sheets

CONTRAST OPTIMIZATION OF IMAGES

TECHNICAL FIELD

Aspects of the invention relate generally to contrast optimization. More specifically, aspects of the invention relate to methods and systems for optimizing contrast of digital images and video.

BACKGROUND

Video and still-image cameras are increasingly becoming ubiquitous in our technologically-advanced society. In fact, cameras are now integrated into a broad range of electronic devices, such as mobile or cellular phones. It is quite common for mobile phone users to utilize an integrated camera on a regular basis, such as capturing an image or video of a contact and displaying the image of the contact when the contact calls the user of the mobile phone.

Furthermore, mobile terminals equipped with cameras allow users to capture images and video and then transmit the captured video and images to remote locations. Because of the size limitations placed on cameras and sensors that are part of mobile terminals, it is common for captured images to have poor quality. In particular, contrast and intensity levels are often set at levels that result in poor image quality.

Given the size, energy requirement, and processing limitations of mobile phones and other electronic devices, most integrated cameras will not have all features associated with traditional cameras, such as a flash. Therefore, some captured images may have impaired contrast. Thus, technological advances for contrast optimization have been developed.

When performing contrast optimization, methods generally attempt to utilize the dynamic range for a specific image and/or video segment as accurately as possible. Thus, the image pixels are processed to achieve optimal dynamic range utilization. Traditionally, the simplest solution has been the application of a predetermined filter to an image. This method is not very robust, however, because the image content defines the optimal target dynamic range.

Another prior solution has been to apply image adaptive filters. In one example, the image analysis process may resemble a human viewer interpretation of the image. Between these solutions, some features of the images can be selected for defining the target dynamic range and for basis of the image processing function calculation.

As readily known to those skilled in the art, different images traditionally require different solutions as they exhibit drastically different features. For example, FIGS. 1-5 provide examples of image histogram classes representative of images that traditionally require different processing methods. As presented throughout this application, the histograms illustrate the dynamic range of exemplary images with the x-axis representing the pixel values with the left most spectrum of the x-axis comprising the darkest pixel values and the right most spectrum comprising lighter pixel values. The y-axis represents the amount or qualitative level of that particular pixel value. A review of FIGS. 1-5 will further elaborate and explain on these concepts and introduce the reader to relative terms. Further, as explained in more detail below, despite the histograms having vastly different characteristics, they may all be effectively modified according to one or more embodiments of the invention.

Figure 1:
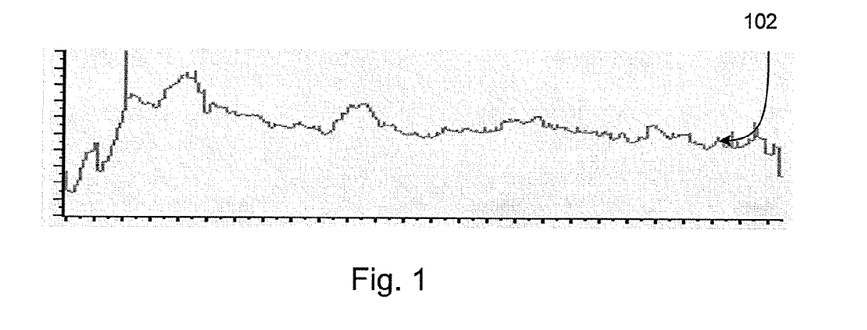
FIG. 1 is an illustrative histogram of an image that utilizes the whole dynamic range almost equally that may be modified according to aspects of the invention.

FIG. 1 is an exemplary histogram of an image that utilizes the whole dynamic range almost equally. Traditionally, this kind of histogram is considered to illustrate a well contrasted image. However, the image represented by the histogram does have a slightly higher relative abundance "darker" pixel values than "brighter" ones as evidenced with histogram 102 being slightly more elevated on the left side than when compared with the right side.

Figure 2:
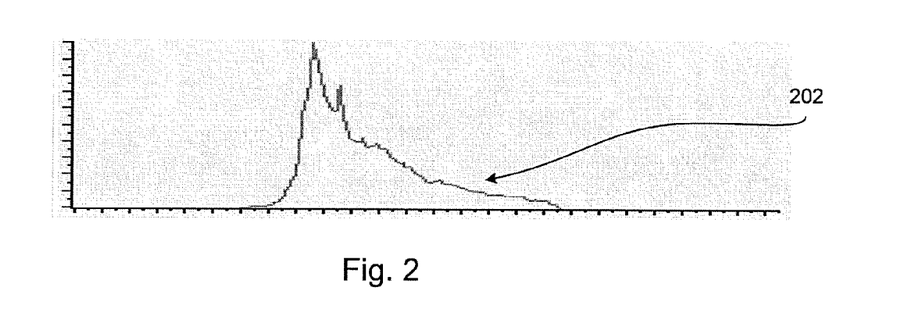
FIG. 2 is an illustrative histogram of a low-contrast image that may be modified according to aspects of the invention.

FIG. 2 is an exemplary histogram of a low-contrast image. As seen with histogram 202, only part of dynamic range is utilized, specifically towards the middle of the dynamic range and absent from the right and left sides, indicating that dark and bright pixels are missing form the image, respectively. One prior method of contrast enhancement that may be applied to the image represented in FIG. 2 may be contrast enhancement by a fixed function, such as y=ax+b, where a=contrast gain and b=brightness addition. The parameters can be set manually, through a predetermined fixed contrast enhancement factor, or the values can be obtained somehow from the image (histogram), in which case the algorithm can be thought to be part of the next class. This solution may also be used for enhancement of the image represented in FIG. 3.

Figure 3:
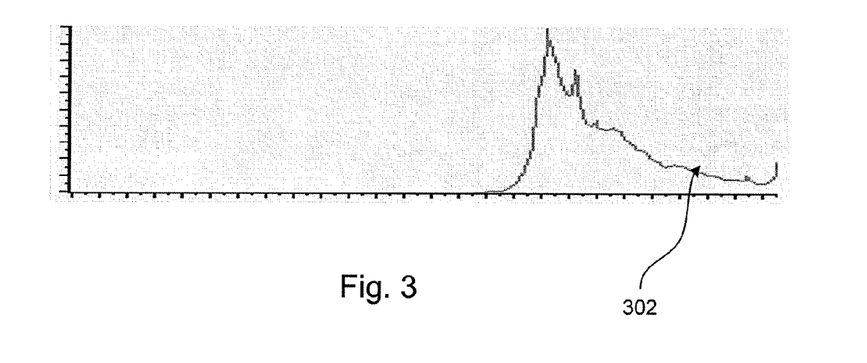
FIG. 3 is an illustrative histogram of another low-contrast image that may be modified according to aspects of the invention.
Figure 4:
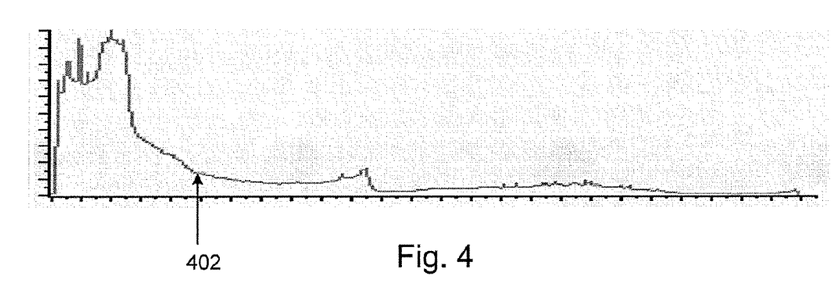
FIG. 4 is yet another illustrative histogram of a low-contract image that may be modified according to aspects of the invention.
Figure 5:
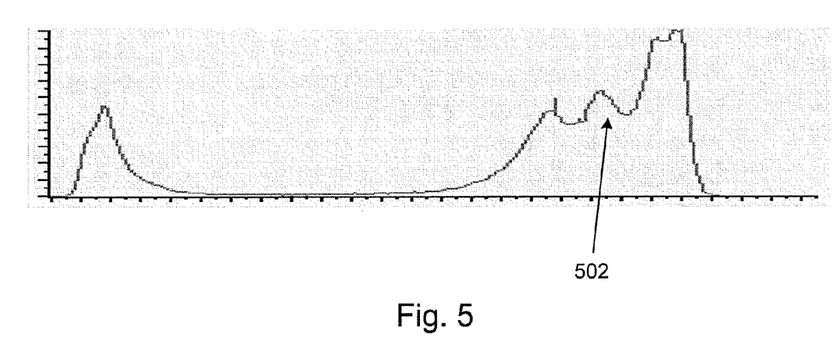
FIG. 5 is an illustrative histogram exhibiting multiple peaks with different intensity levels that may be modified according to aspects of the invention.

FIG. 3 is an exemplary histogram of another low-contrast image. Unlike FIG. 2, however, the histogram is not at the middle intensity level. Rather, as seen with histogram 302, the image has large bright area, but the darkest pixels are absent. Some pixel values are also overly saturated (i.e. burned to white). It is obvious to one skilled in the art that such a narrow histogram can be located around any intensity level and FIG. 3 is just but an example. While FIGS. 2 and 3 represent histograms of images that may be enhanced effectively with a fixed function, there are several other images, that may not effectively enhanced by fixed function, for example, due to driving some pixel values into saturation. For example, the image represented by the histogram in FIG. 1 and those presented in FIGS. 4-5 are not readily suited for this procedure. Further, in case of multiple intensity level areas, such as presented below in FIG. 5, only one of those areas of high intensity can be enhanced, while causing the other remaining ones are driven into saturation.

Histogram stretching is another method that may be utilized for contrast optimization. In histogram stretching, the parameters "a" and "b" are derived form the tails of the histogram. These are then are stretched to the ends of the dynamic range. The stretching can be further developed so that the different parts of the dynamic range are stretched differently, for example, as explained in Jain, Anil K., Fundamentals of Digital Image Processing, Prentice Hall, 1989, p. 235, incorporated herein by reference in its entirety. Similar to contrast enhancement by a fixed function, however, only the images represented by the histograms in FIGS. 2 and 3 may be optimized. Furthermore, there may be the problem of determining how to find the correct parameters for the stretching.

FIG. 4 is an exemplary histogram of another low-contrast image. Histogram 402 shows an exemplary histogram in which the whole dynamic range is utilized but there are substantially more dark pixels than bright pixels. Thus in the image represented by the histogram, there is a large dark area, which has quite low contrast. One skilled in the art will readily understand that the large area can be also bright, or having any other intensity level. Regarding FIG. 4 as presented, another method that may be utilized could be a gamma correction type of nonlinear function, such as expressed as $y=x^g$, where "g" is the gamma value. The gamma value can be adaptive, e.g. <1 for histograms having most of values on the dark side and >1 for bright images. Similar to the contrast enhancement by a fixed function method, however, the adaptive gamma method can enhance only one of the different intensity level areas. Therefore, any others are impaired with reduced contrast. The adaptive gamma also requires class 1 or 2 algorithms for the processing of the complete dynamic range, because the gamma only modifies the relational proportion of different intensity levels, i.e. histogram (contrast) stretching is not achieved.

As introduced above, FIG. 5 is an exemplary histogram having multiple peaks with different intensity levels. As seen with histogram 502, there is a dark part and bright part in the image in which both have low contrast as seen with both peaks being relatively narrow. This kind of histogram is typical, for example, when an object is captured in front of bright background. In many practical cases, part of pixels are also saturated to black or white. One technique that may be applied to such an image may be histogram equalization to make a non-linear mapping function, such as expressed by y=f(x), that equalizes the image histogram. For example, the image pixel values are re-mapped so the approximate amount of pixels having each available intensity level is the same, such as explained in Jain, Anil K., Fundamentals of Digital Image Processing, Prentice Hall, 1989, pp. 241-242, incorporated herein by reference in its entirety. Therefore, the resulting histogram has a principal shape similar to histogram 102 one presented in the FIG. 1.

Histogram 302, presented in FIG. 3, may also be processed adequately with this method; however, the basic histogram equalization is too strong of an operation for the enhancement of natural images, because all histograms are made flat. Therefore, any intended variation is lost along with the natural appearance of the image. Gain limit modifications can be added, however, the balance between robustness and visible enhancement result is often too difficult to find.

One class of algorithms often utilized for contrast optimization utilizes spatially local information. For example, the signal may be divided into low-pass and high pass bands. The low-pass band presents the overall brightness of the spatial area. Gaining the high-pass band increases the contrast around that brightness level. Depending on the selection of frequency bands, at some point this algorithm class starts to resemble sharpening, which means enhancement of local contrast around edges. There exist multiple variations on how the overall brightness is estimated and how the contrast is processed. The problem, however, is that these algorithms tend to produce ringing type of artifacts, or are computationally more complex than the other classes. Moreover, given the size, energy requirements, and processing limitations of a mobile phones and other electronic devices, these methods are often too complex or otherwise too specific to select types of captured images or video Hence, there is a need for efficient and effective methods and systems for performing contrast optimization for images having different characteristics. There is a further need for systems and methods that can perform contrast optimization with reduced processing and energy requirements.

BRIEF SUMMARY

Aspects of the invention utilize histograms and/or data derived from histograms of an image to calculate a processing function based on the image histogram. In one embodiment, novel systems and methods are utilized to determine the parameters for contrast stretching. Such novel methods and systems are simple enough to be calculated on computing devices having limited processing power, such as mobile terminals. In further embodiments, novel methods of contrast optimization may be implemented on computing devices having limited storage mediums, such as mobile terminals.

Further aspects of the invention relate to novel methods for managed control on limiting the stretching strength of a stretching function, thus maintaining the natural appearance of images, tolerable amount of noise enhancement, and contrast reduction on less desirable parts of the image. In select embodiments, methods are utilized to control the amount of pixels of an image captured on a mobile terminal or computing device having limited capabilities driven onto saturation.

In further aspects of the invention, a stretching function can be presented as one Look Up Table (LUT), thus allowing fast computations on computing devices such as mobile terminals. Embodiments of the invention allow robust enhancement of images having vastly different histogram profiles, such as low contrast images, high contrast images, images having several peaks, among further histogram profiles known in the art and discussed throughout this disclosure. In select embodiments, the method is more controllable compared with prior art methods. In yet other embodiments, contrast enhancement is more effective.

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention. It is further noted that various connections are set forth between elements in the following description. It is noted that these connections in general and, unless specified otherwise, may be direct or indirect and that this specification is not intended to be limiting in this respect.

Figure 6:
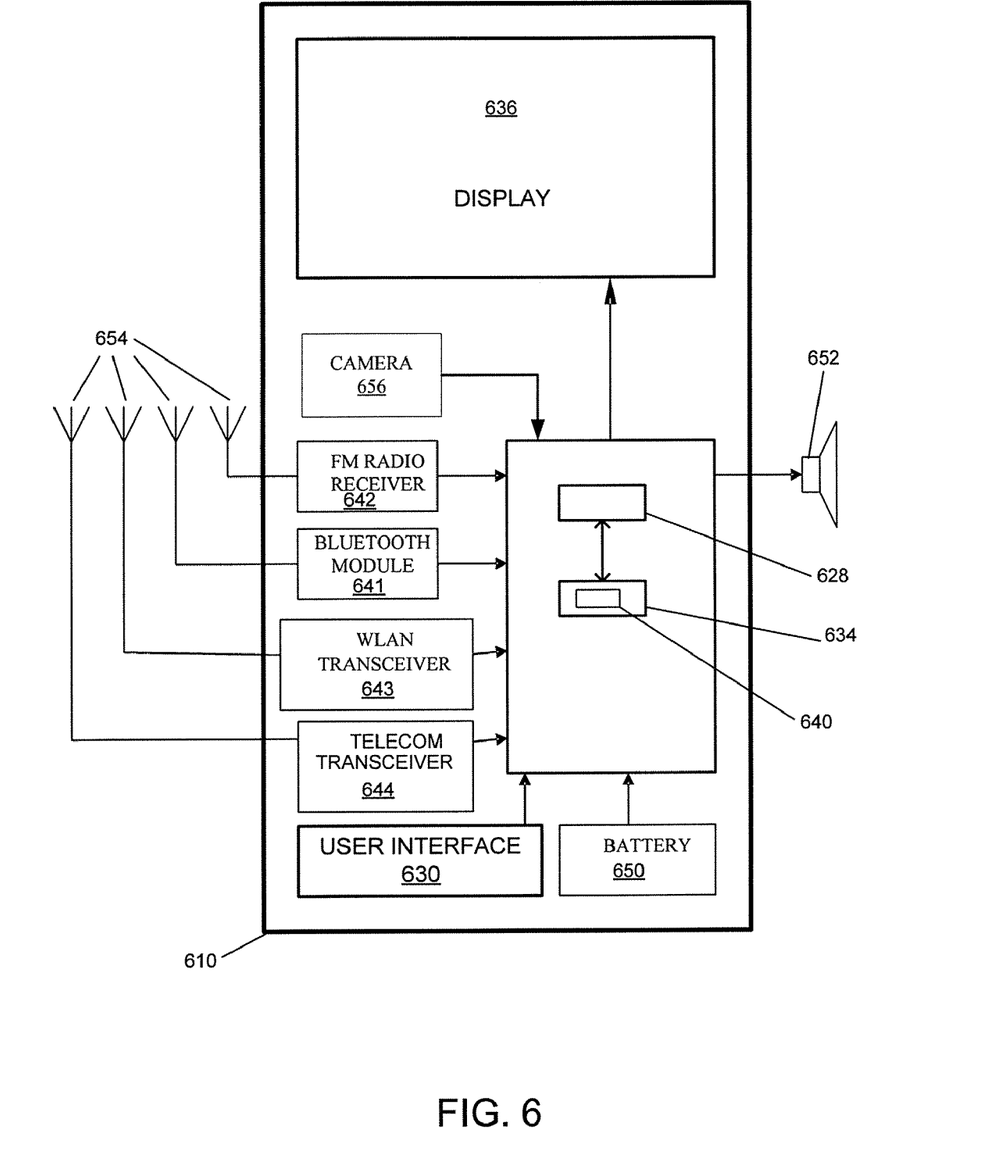
FIG. 6 illustrates an exemplary mobile terminal that may be used to implement aspects of the present invention.

Aspects of the invention may be implemented with digital cameras and devices that include digital cameras. Devices that include digital cameras include mobile terminals and portable computer devices. FIG. 6 illustrates an exemplary mobile terminal 610 that may be used to implement aspects of the invention. As shown in FIG. 6, a mobile terminal 610 may include a processor 628 connected to a user interface 630, a memory 634 and/or other storage, a display 636 and a camera 656. Mobile terminal 610 may also include a battery 650, a speaker 652 and antennas 654. User interface 630 may further include a keypad, touch screen, voice interface, one or more arrow keys, joy-stick, data glove, mouse, roller ball, touch screen, or the like.

Computer executable instructions and data used by processor 628 and other components within mobile terminal 610 may be stored in computer readable memory 634. Memory 634 may be implemented with any combination of read only memory modules or random access memory modules, optionally including both volatile and nonvolatile memory and optionally being detachable. Software 640 may be stored within memory 634 and/or storage to provide instructions to processor 628 for enabling mobile terminal 610 to perform various functions. Alternatively, some or all of mobile terminal 610 computer executable instructions may be embodied in hardware or firmware (not shown).

Mobile terminal 610 may be configured to send and receive transmissions based on the BLUETOOTH standard, through a specific Bluetooth module 641. Additionally, mobile terminal 610 may also be configured to receive, decode and process transmissions through an FM/AM radio receiver 642, a wireless local area network (WLAN) transceiver 643, and a telecommunications transceiver 644. In one aspect of the invention, mobile terminal 60 may receive radio data stream (RDS) messages. Mobile terminal 60 may be equipped with other receivers/transceivers, e.g., one or more of a Digital Audio Broadcasting (DAB) receiver, a Digital Radio Mondiale (DRM) receiver, a Forward Link Only (FLO) receiver, a Digital Multimedia Broadcasting (DMB) receiver, etc. Hardware may be combined to provide a single receiver that receives and interprets multiple formats and transmission standards, as desired. That is, each receiver in a mobile terminal device may share parts or subassemblies with one or more other receivers in the mobile terminal device, or each receiver may be an independent subassembly.

Figure 7:
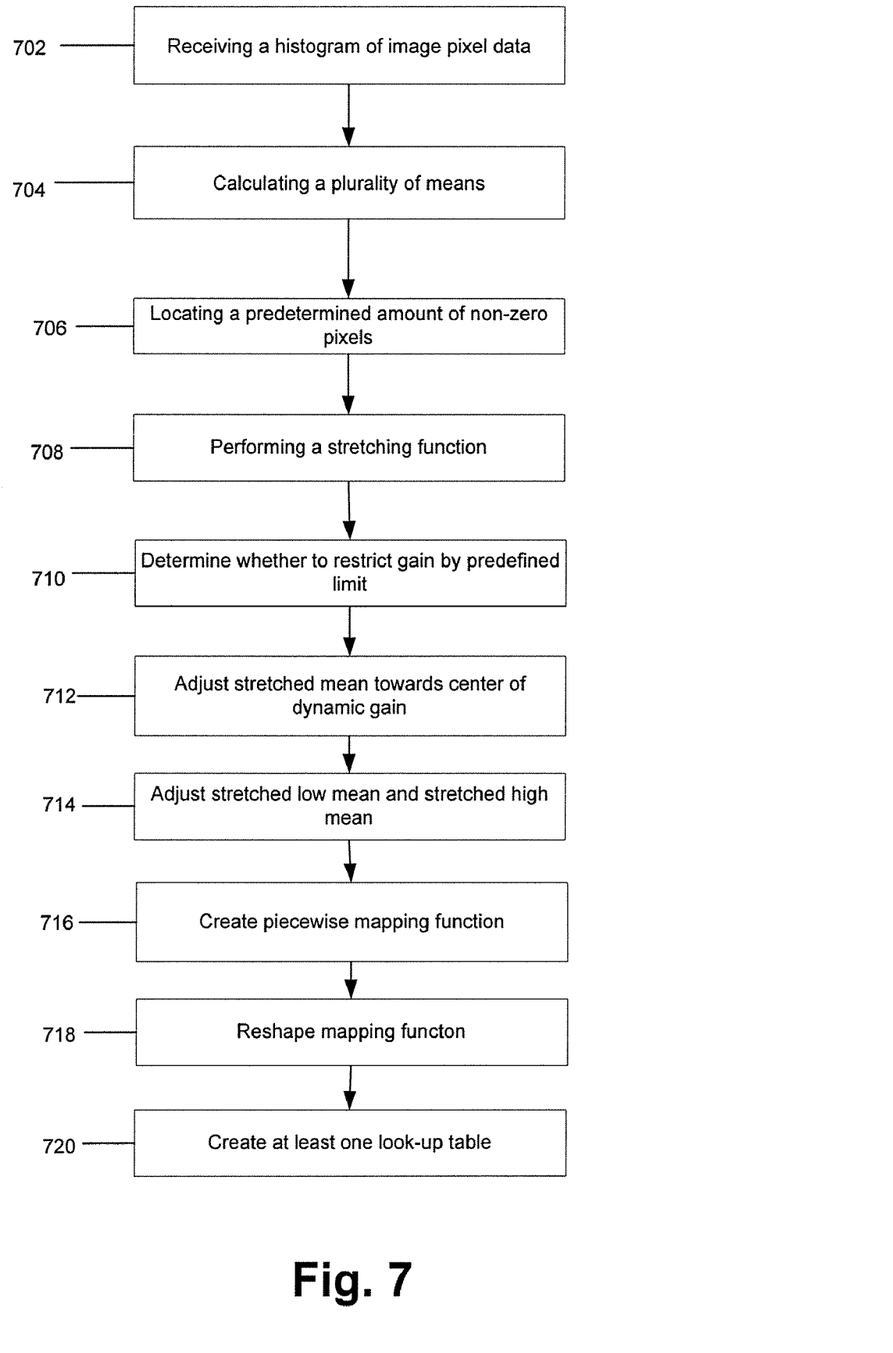
FIG. 7 is a flowchart of one exemplary method according to one embodiment of the invention.

FIG. 7 is a flowchart of one exemplary method according to one embodiment of the invention. FIG. 7 provides a collection of actions that may be conducted in whole or in part to achieve one or more advantages of the invention. As would be understood by those skilled in the art and readily apparent from the disclosure below, including the appended claims, one or more of the actions described in relation to FIG. 7 may be omitted or modified without departing from the scope and spirit of the invention. Further, those skilled in the art realize that one or more actions may be included within the described methods without deviating from the claimed subject matter.

As shown in FIG. 7, a histogram of image pixel data is received (step 702). In one embodiment, the image pixel data is received from a camera operatively connected to mobile device 610. In one such embodiment, the image pixel data is stored on one or more computer-readable mediums within the mobile device. As used herein, image pixel data includes any data associated with an image. Furthermore, the data may be in different formats, such as but not limited to: RGB or YUV. In one embodiment, the image data is in luminance (Y) and/or chrominance (U&V) format.

In yet another embodiment, where the image pixel data is in color component format, histograms may be gathered for multiple components, and the actions described below in relation to one histogram may be applied to each histogram.

As used herein, the term "image" encompasses still images as well as video images. In essence, video is a sequence of images, which according to various embodiments, may be processed individually. In those embodiments utilizing image pixel data from video sequences, it may be beneficial to add some flicker prevention, such as a filter to the histograms or mapping functions, for example as described in U.S. Pat. No. 6,148,103, incorporated herein by reference in its entirety.

Figure 8:
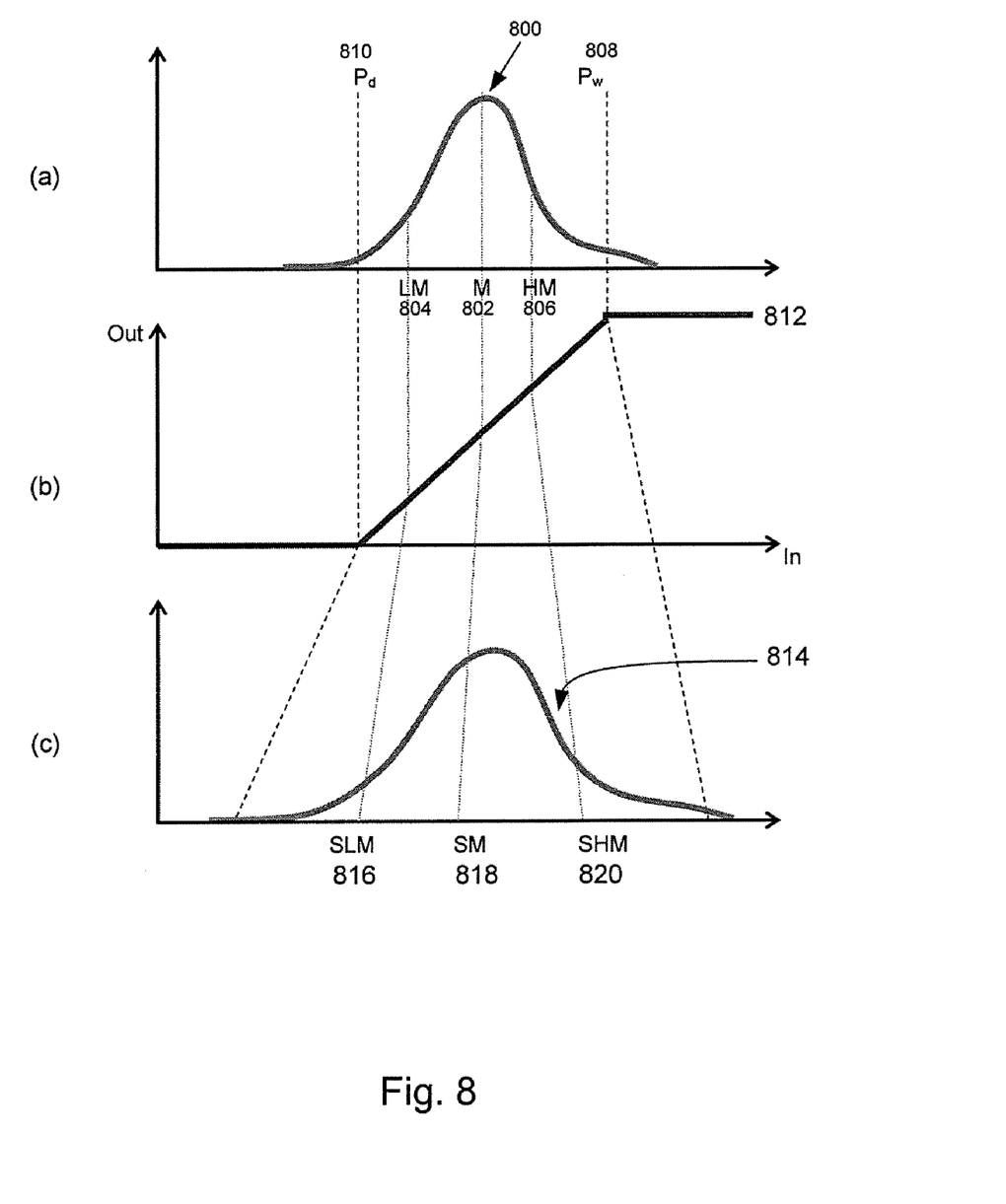
FIGS. 8a-8c shows the determination of mean values of an illustrative histogram according to an exemplary method of the invention.

At step 704, a plurality of mean values are calculated. In one embodiment, a processor, such as processor 628 within mobile terminal 610 calculates the mean values. The calculated mean values may include at least: a mean, a high mean, and a low mean. FIG. 8a shows exemplary histogram 800 of image pixel data having calculated mean values. Exemplary histogram 800 exhibits an overall bell-shaped curve with respect to the y-axis and has two ends along the x-axis. As seen in FIG. 8a, the mean (M) 802, low mean (LM) 804, and high mean (HM) 806 values are calculated from exemplary luminance pixel data of exemplary histogram 800.

The mean 802 is a mean of the luminance values. The low mean 804 is the mean of all luminance values between the absolute minimum values and mean 802. Accordingly, the high mean 806 is the mean of all luminance values between the calculated mean 802 and the absolute maximum value. As seen in exemplary histogram 800, the LM 804 is more distant from the mean 802 than the HM 806. One skilled in the art will readily understand that, depending on the image pixel data, the LM may be closer to the mean than the HM. Yet in other embodiments, they are about equidistant.

At step 706, a predetermined amount of nonzero pixel values from the component values may be located. As seen in the illustrative embodiment shown in FIG. 8a, the location of the nonzero pixel values is initiated at about the mean 802 of the histogram 800 and continues along the x-axis in a first direction (towards the right in FIG. 8) to reach a Pw value 808 and along a second direction (left) to reach a Pd value 810. As discussed in more detail in the following paragraph, the Pw parameter controls how much pixels can be driven into saturation at the bright end of the dynamic range for the histogram. Pd is similar to Pw, but on the dark end of the dynamic range.

The predetermined amount of nonzero pixels may differ among different embodiments. Furthermore, the amount of nonzero pixels located in the one direction (i.e., towards Pw) may different than the amount located in the other direction (i.e., towards Pd). For example, regarding Pw, the strength of enhancement may be altered among different embodiments since the Pw parameter controls how much pixels can be driven into saturation at the bright end of the dynamic range. If a burning effect occurs where pixels around the chosen Pw are "burned" to white, then the Pw value may be decreased. Conversely, if more saturated pixels can be allowed, the strength of enhancement can be increased by increasing the Pw parameter value. The same process may be used in a similar manner when adjusting the parameter Pd which is located on the dark end of the dynamic range.

At step 708, an overall stretching function may be performed on a predetermined amount o of non-zero image pixel data values of the histogram comprising at least a stretched mean, a stretched hi-mean, and a stretched low-mean. Since the stretching function is performed on the predetermined amount of nonzero pixels all histogram data in between Pw 808 and Pd 810 is affected. See, for example, FIG. 8b showing function 812 being performed on histogram data including M 802, LM 804, and HM 806. Thus, looking to FIG. 8c, stretched histogram 814 is obtained having a stretched mean (SM) 818, a stretched high mean value (SHM) 820, and stretched low mean (SLM) 816. As seen with histogram 814, the Pw 808 and Pd 810 values are stretched to the extremes of the available signal range using linear mapping functions. The stretching step drives a certain percentage of pixel values into saturation, (i.e. to black or white), where the allowed number of saturated pixels is controlled by percentage values, such as Pd 810 and Pw 808.

Despite the use of parameters such as exemplary Pw 808 and Pd 810, the amount of histogram stretching performed in step 708 may be too high when applied to certain images, thus providing unaesthetic results. Because, however, the gain of the stretching function is directly related to the width of the histogram, the gain can be limited by defining a limit (L or GlobalStretchLimit) for the width of the histogram to be stretched to the full dynamic range (overall gain limit). For example, when applied to different systems, low contrast displays and sensors with low sensor noise allow more powerful enhancement. The percentage values (Pd, Pw) are used for excluding the effect of random noise or occasional saturated pixels. In the event, however, these pixels do not exist, image data may be stretched to saturation, which may be seen as an artifact.

Figure 9:
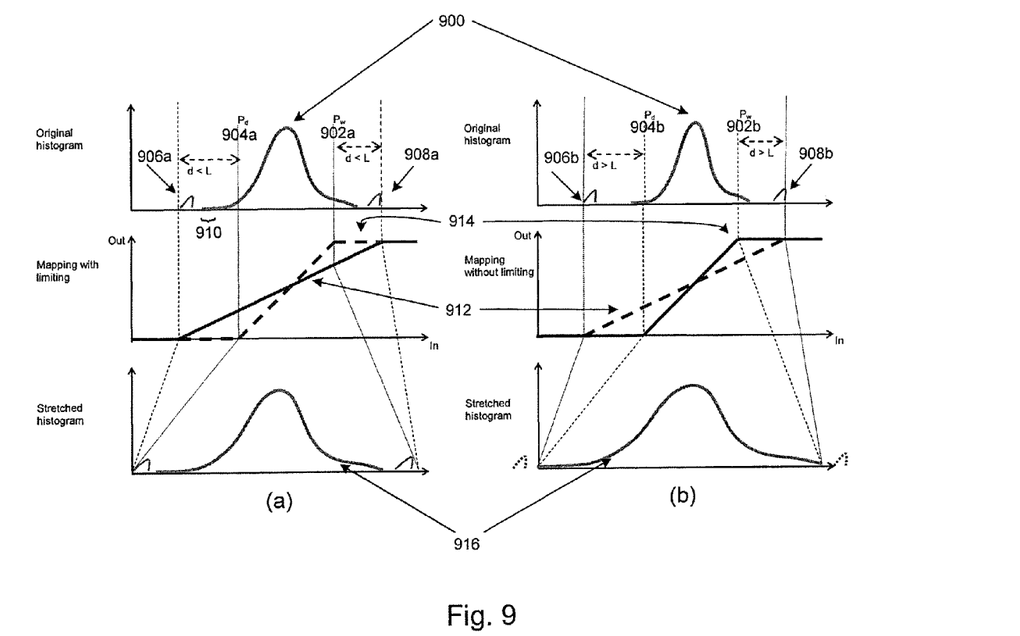
FIGS. 9a-9b demonstrate the limiting of the amount of pixels stretched into saturation according to one exemplary method incorporating aspects of the invention.

FIGS. 9a and 9b show exemplary histogram 900 stretched according to two different mapping functions. As will be explained in the context of FIGS. 9a and 9b, the amount of pixels stretched into saturation can be limited by a distance (d) between the pixels considered as noise and the actual histogram data to be stretched, for example according to the parameters Pw and Pd.

Looking first to FIG. 9a, histogram 900 has a similar shape as histogram 800 that is transected by Pw 902a and Pd 904a. As further seen in histogram 900a, the absolute minimum value 906a along the x-axis falls outside of Pd 904a and the absolute maximum value 908a is located on the outer side of Pw 902a. This provides one example, where a step may be utilized to determine whether to restrict the gain according to a predefined limit.

Step 710 may be utilized to determine whether to restrict the gain according to a predefined limit. In one embodiment as applied to histogram 900a, step 710 may comprise a substep to determine the distance between the absolute nonzero minimum 906a and the Pd value 904a indicated by distance 910. If distance 910 is less than a predetermined limit (d<L), then all the non-zero pixel values below the mean, including the minimum nonzero value 906a will undergo stretching function 912, indicating the minimum nonzero value 906a is not attributed to noise but rather a valid value to be included within the process (dashed line 914a is provided to show an alternative function that may be performed if d>L). Likewise, if the distance between the absolute nonzero maximum value 908a and the Pw value 902a is less than a predetermined limit (d<L), then all non-zero pixel values above the mean, including the maximum non zero value 908 will undergo stretching function 912. As one skilled in the art will readily appreciate, these analyses may conducted simultaneously and/or utilize the same or different distances for each section of the histogram. Stretched histogram 916 provides one result of stretching function 912 being applied to histogram 900a where d<L, as such the absolute nonzero values 906a and 908a are included.

FIG. 9b again shows histogram 900 having the absolute minimum value 906b along the x-axis falls outside of Pd 904b and the absolute maximum value 908b is located on the outer side of Pw 902b. Unlike the case shown in FIG. 9a, the distance between the absolute values 906b and 908b is greater than predetermined limits (d>L). In such an instance, Pw 902b may be determined to be the upper end of the histogram 900b and Pd 904b may be determined to be the lower end of the histogram 900. Thus, mapping function 914 is performed instead of mapping function 912 (which was performed in the example shown in FIG. 9a). Stretched histogram 916 of FIG. 9b provides one result of stretching function 914 being applied to histogram 900 where d>L, as such the absolute nonzero values 906b and 908b are included. As seen in exemplary histogram 916 of FIG. 9b, the absolute values are driven into saturation on both the dark end as well as the light end of the dynamic range.

As seen when comparing FIGS. 9a and 9b, when d<L, values 906 and 908 are counted as actual histogram data, thus reducing the gain of the stretching function (see the slope of stretching function 912 compared to function 914) and produces narrower stretched histogram 916, when compared to a situation shown in FIG. 9b where the absolute values 906b and 908b are further away from the actual histogram data than the distance L. Thus, the stretching function 914 uses the greater gain, thus producing a wider histogram 916 of FIG. 9b.

Instead of using merely applying global histogram stretching, actions may be implemented to use piecewise continuous linear stretching to allow S-curve type of enhancement to allow different type of gains for dark, mean and bright luminance values. Step 712 may be implemented to adjust the stretched mean computed or otherwise obtained, for example in step 702, by a predetermined amount towards the center of the dynamic range to create a corrected stretched mean.

Figure 10:
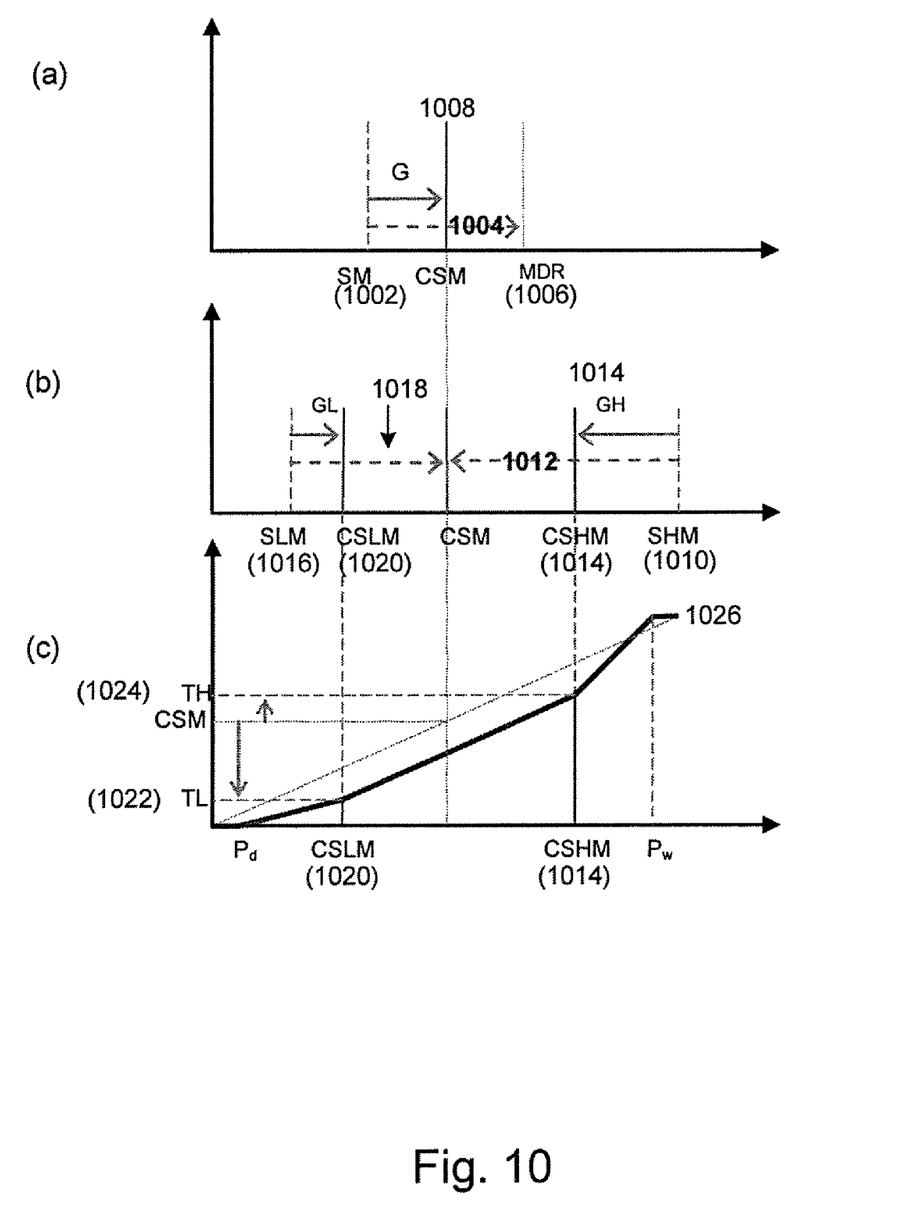
FIGS. 10a-10c show an exemplary method of shifting a plurality of mean values according to one embodiment of the invention.

FIG. 10 shows stretched mean (SM) 1002 being adjusted by a predetermined amount "G" in direction of arrow 1004 along the x-axis towards the center of the dynamic range (MDR) 1006 to create a corrected stretched mean CSM 1008. Since the global stretch also changes the low mean, mean and high mean values in the enhanced image, the stretched low mean (SLM), stretched mean (SM) and stretched high mean (SHM) values need to be corrected accordingly. In one embodiment, step 714 may be implemented to utilize predetermined ratios between the CSM 1008 and the ends of the dynamic range for adjustments. For example, in FIG. 10b, SHM 1010 is adjusted by "GH" in direction of arrow 1012 along the x-axis towards CSM 1008 to obtain a corrected stretched high mean (CSHM) 1014. In one embodiment CSHM may set to equal (100+x)% of CSM 1008. As seen in FIG. 10b, the SLM 1016 is corrected is adjusted by CSLM in direction of arrow 1018 along the x-axis towards CSM 1008 to obtain a corrected stretched high mean (CSLM) 1020. Of course, those skilled in the art will realize that any ratio, percentage, or adjustment may be utilized in step 714.

At step 716, a piecewise linear mapping function is created. FIG. 10c shows one exemplary piecewise linear mapping function according to the data of FIGS. 10a and 10b. As seen in FIG. 10c, a corrected mapping function may be formed such that the CSLM 1020 is mapped to target low mean values (TL) 1022, where TL may be expressed and determined by x % of CSM. TL is a parameter that is set in regards to the amount of enhancement for low color values. Images exhibiting low contrast on dark image areas may require higher gain values. Conversely, if images appear too bright, the TL value can be decreased.

Similarly, CSHM 1014 is mapped to target high mean value (TH) 1024, where TH may be expressed and determined by CSM+y % of (full range−CSM). Thus, TH=CSM+y % of the difference to the brightest possible value in the dynamic range. The TH parameter determines the amount of enhancement for bright color values of the image represented by the image pixel data. Images exhibiting low contrast on bright and white image areas may require higher gain values. If images appear too dark the value can be decreased.

Thus, as seen in FIG. 10*c*, the mapping function (shown as 1026) comprises 3 different slopes along the function, thus providing three different gains for the image pixel values of the histogram. Since the mapping function shown in FIG. 10*c* allows different gains for dark and bright luminance values, one of the three gains may be too steep or flat compared to the other two gains. Such an occurrence may be visible on some images as constant or quantizised areas. Thus in some embodiments, gain limits may be used to prevent gains that exhibit a slope that is too steep or too flat. According to step 718, the mapping or stretching function of created at step 716 is reshaped so that one ore more gains of the function is confined to predetermined limits.

Figure 11:
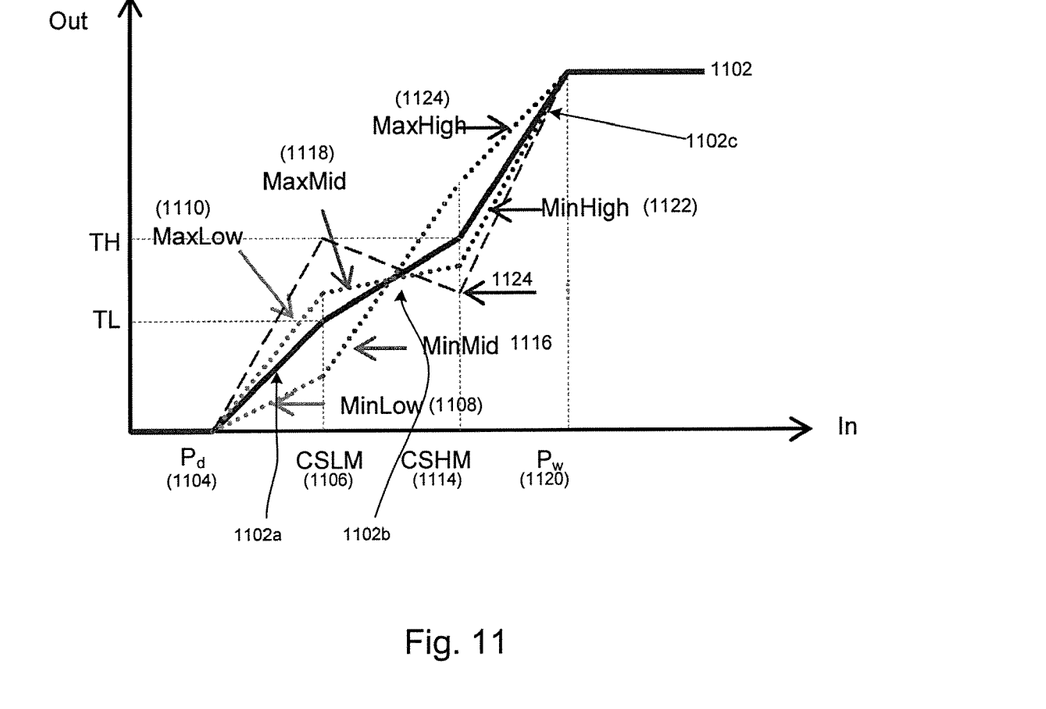
FIG. 11 shows the application of gain limits to a mapping function according to one embodiment of the invention.

As shown by way of example, FIG. 11 shows a mapping function having a plurality of gains that may be confined to predetermined limits according to one embodiment of the invention. As seen in FIG. 11, exemplary mapping function 1102 has three distinct slopes. The first slope 1102*a* of mapping function 1102 extends from Pd 1104 towards CSLM 1106. In one embodiment, where the exemplary mapping function 1102 relates to luminance image data, first slope 1102*a* would relate to "dark pixels" with the values closer to Pd 1104 being darker than values closer to CSLM 1106. As seen in FIG. 11, values MinLow 1108 and MaxLow 1110 are utilized as limits for first slope 1102*a* representing the dark values. Mapping function 1102 possesses second slop 1102*b* that stretches from CSLM 1106 to CSHM 1114. Values Min-Mid 1116 and MaxMid 1118 are utilized as minimum and maximum values, respectively. Mapping function 1102 comprises further a third slope 1102*c* that extends from CSHM 1114 to Pw 1120, which would correspond to bright luminance values, where the values closer to Pw 1120 would be brighter than those values closer to CSHM 1114. As also shown in FIG. 11, MinHigh 1122 and Maxhigh 1124 are the minimum and maximum gain limits, respectively of slope 1102*c*.

Since slopes 1102*a*, 1102*b*, and 1102*c* of mapping function 1102 are each within the minimum and maximum parameters for each of the 3 specific slopes, mapping function 1102 is not modified according to exemplary step 718. However, exemplary mapping function 1124 extends beyond the minimum and maximum values for each of the 3 slopes, thus may be modified according to step 718 to have the gain of at least one of the slopes limited to fit within the minimum and maximum values for that slope. For example, as seen in FIG. 11, the section of mapping function 1124 that stretches from Pd 1104 to CSLM 1106 is entirely above MaxLow 1110, therefore in one embodiment, the gain is limited such that MaxLow 1110 becomes the gain for that slope of mapping function 1124. In one embodiment, all the slopes of mapping function are modified to be within the minimum and maximum values for each respective slope.

As indicated by step 720, a look-up table (LUT) may be created using the mapping function created at step 718. As one skilled in the art will appreciate with appreciate from the foregoing disclosure, that the above methods and systems utilizing such methods may incorporate a mixture of the aforementioned steps with a mixture of histogram components. For example, in one embodiment. A histogram may be gathered from luminance estimate data (e.g. aR+bG+cB) where one LUT is computed in step 720 and all components (RGB) are processed with the same LUT created in step 720. This would negate the need for color balance control or saturation correction.

According to one embodiment performed on a mobile terminal, the component value is luminance (Y) of a YUV image and the gain of UV may be corrected accordingly. In one embodiment: Gain=0.7*StretchedY/Y+0.3, wherein the U component is determined according to the equation: U=Gain*U. Yet in another implementation, a numerical value may be utilized in the determination where U and/or V have negative values, such as an unsigned integer (byte) implementation. In one such embodiment, the equation U=128+Gain*(U−128), may be utilized where 128 equals the number of bytes and the V component is determined according to the equation: V=128+Gain*(V−128). The value 128 may be utilized since the value is one-half the dynamic range of an embodiment having 8 bits with values ranging from zero (0) to two hundred fifty five (255). Therefore, using this value, a range (−128, 127) is presented using unsigned numbers.

At step 722, any further modifications may be incorporated. For example, the methods and mapping functions can be used in embodiments where the dynamic range of the target image data is different than the available dynamic range of the original image data (e.g. 10 to 8 bit reduction). In one embodiment, the mapping function is scaled to the target image data, thereby allowing the optimal display of images having high dynamic ranges with limited about of bits. Further, the methods may be applied to whole images or individually, with possible control on the allowed spatial variation to local areas in the image.

As discussed above, each of the processing steps may be performed on a computing device having limited processing capabilities, such as a mobile terminal. In testing one embodiment of the invention, a complexity estimate was conducted utilizing an ARM9 compiler and processor. In such an embodiment, the algorithm utilized less than 50 Mcycles to process a 1.0 mega-pixel image. In further testing of the same embodiment, the inventors have discovered that the complexity of the algorithm increases linearly as the image size increases. Further, the functions utilized did not require a significant amount of memory to process the images. Memory is allocated only for a few LUTs (3*256*integer+256*byte) and in select embodiments, the size of the executable code is negligible, generally being only a few Kbytes.

The embodiments herein include any feature or combination of features disclosed herein either explicitly or any generalization thereof While the invention has been described with respect to specific examples including presently preferred modes of carrying out the invention, those skilled in the art will appreciate that there are numerous variations and permutations of the above described systems and techniques.

We claim:
1. A device comprising:
a camera configured to capture at least one image;
a computer readable medium having computer-executable instructions that when executed by a processor in the device cause the device to perform:

retrieve, from data for an image captured with the camera, a plurality of image pixel data values for at least one component of the image configured to form a histogram across a dynamic range having a plurality of mean values including a mean, a hi-mean, and a low-mean;

stretch a predetermined amount of non-zero image pixel data values of the histogram to obtain at least a stretched mean, a stretched hi-mean, and a stretched low-mean;

adjust the stretched mean towards the center of the dynamic range of the histogram to get a corrected stretched mean;

utilize predetermined ratios between the corrected stretched mean and the ends of the dynamic range, adjust the stretched high mean to get a corrected stretched high mean and adjust the stretched low mean to obtain a corrected stretched low mean;

form a piecewise linear mapping function that maps the corrected stretched low mean to target low mean values and the corrected stretched high mean to target high mean values; and compute gains of the piecewise linear function and reshape the dynamic range so that all of the gains computed are between predetermined minimum and maximum limits; and create a stretching look-up table of the image pixel data values.

2. The device of claim 1, wherein the computer-executable instructions that when executed by the processor in the device, cause the device to further perform:

process at least one image according to the look up table.

3. The device of claim 2, wherein the at least one component comprises luminance estimate data, wherein the computer-executable instructions that when executed by the processor in the device, cause the device to further perform:

compute a plurality of different color components with the look-up table.

4. The device of claim 1, wherein the image pixel values are derived from the Y component of a YUV image, wherein the computer-executable instructions that when executed by the processor in the device, cause the device to further perform:

create a saturation gain look-up table.

5. The device of claim 4, wherein the saturation look-up table is corrected according to a process performed on the device that computes the gain from the Y component of the YUV image according to the equation: Gain=0.7*StretchedY/Y+0.3 and corrects U and V according to the equations: Ucorrected=Gain*U, and Vcorrected=Gain*V.

6. A device comprising:

a camera configured to capture at least one image;

a computer readable medium having computer-executable instructions that when executed by a processor in the device cause the device to perform:

retrieve, from data for an image captured with the camera, a plurality of image pixel data values for at least one component of the image configured to form a histogram across a dynamic range having a plurality of mean values including a mean, a hi-mean, and a low-mean;

stretch a predetermined amount of non-zero image pixel data values of the histogram to obtain at least a stretched mean, a stretched hi-mean, and a stretched low-mean;

adjust the stretched mean towards the center of the dynamic range of the histogram to get a corrected stretched mean;

utilize predetermined ratios between the corrected stretched mean and the ends of the dynamic range, adjust the stretched high mean to get a corrected stretched high mean and adjust the stretched low mean to obtain a corrected stretched low mean;

form a piecewise linear mapping function that maps the corrected stretched low mean to target low mean values and the corrected stretched high mean to target high mean values; and compute gains of the piecewise linear function and reshape the dynamic range so that all of the gains computed are between predetermined minimum and maximum limits, wherein the at least one component of the image pixel data is derived from a color component format, the computer-executable instructions that when executed by the processor in the device, cause the device to further perform:

repeat at least the adjust, utilize, form, and compute instructions for a plurality of histograms that each represents a different color component of the at least one image; and create a separate look-up table for each of the plurality of histograms.

7. The device of claim 6, wherein stretch the predetermined amount of non-zero image pixel data values comprises:

determine distance between at least one of: (1) absolute nonzero maximum value and a Pw value, and (2) absolute nonzero minimum value and a Pd value, wherein if in (1) the distance is greater than a first predetermined limit, then the Pw value is determined to be upper end of the histogram and wherein if in (2) the distance is greater than a second predetermined limit, then the Pd value is determined to be lower end of the histogram.

8. The device of claim 6, wherein the computer-executable instructions that when executed by the processor in the device cause the device to further perform:

create a stretching look-up table of the image pixel data values.

9. The device of claim 6, wherein the image pixel data values are derived from the Y component of a YUV image, the method further comprising:

create a saturation gain look-up table.

10. The device of claim 9, wherein the saturation look-up table is corrected according to a process performed on the device that computes the gain from the Y component of the YUV image according to the equation: Gain=0.7*StretchedY/Y+0.3 and corrects U and V according to the equations: Ucorrected=Gain*U, and Vcorrected=Gain*V.

11. A device comprising:

a camera configured to capture at least one image;

a computer readable medium having computer-executable instructions that when executed by a processor in the device cause the device to perform:

retrieve, from data for an image captured with the camera, a plurality of image pixel data values for at least one component of the image configured to form a histogram across a dynamic range having a plurality of mean values including a mean, a hi-mean, and a low-mean;

stretch a predetermined amount of non-zero image pixel data values of the histogram comprising at least a stretched mean, a stretched hi-mean, and a stretched low-mean;

adjust the stretched mean towards the center of the dynamic range of the histogram to get a corrected stretched mean;

utilize predetermined ratios between the corrected stretched mean and the ends of the dynamic range, adjust the stretched high mean to get a corrected stretched high mean and adjust the stretched low mean to obtain a corrected stretched low mean; and form a piecewise linear mapping function that maps the corrected stretched low mean to target low mean values and the corrected stretched high mean to target high mean values, wherein the adjust of the stretched high mean comprises:
adjust the stretched low mean by adding x % of the difference between the corrected stretched mean and the stretched low mean to determine the corrected stretched low mean, wherein x is a predetermined value; and
adjust the stretched high mean by subtracting x% of the difference between the stretched high mean and the corrected stretched mean to determine the corrected stretched high mean, wherein x is a predetermined value.

12. The device of claim 11, wherein the computer-executable instructions that when executed by the processor in the device cause the device to further perform:
compute gains of the piecewise linear mapping function and reshape the dynamic range so that all of the gains computed are between predetermined minimum and maximum limits.

13. The device of claim 11, wherein stretch the predetermined amount of non-zero image pixel data values comprises:
determine distance between at least one of: (1) absolute nonzero maximum value and a Pw value, and (2) absolute nonzero minimum value and a Pd value, wherein if in (1) the distance is greater than a first predetermined limit, then the Pw value is determined to be upper end of the histogram and wherein if in (2) the distance is greater than a second predetermined limit, then the Pd value is determined to be lower end of the histogram.

14. The device of claim 11, wherein the computer-executable instructions that when executed by the processor in the device cause the device to further perform:
create a stretching look-up table of the image pixels data values.

15. The device of claim 11, wherein at least one component of the image pixel data is derived from a color component format, and wherein the computer-executable instructions that when executed by the processor in the device cause the device to further perform:
repeat at least the stretch, adjust, utilize, and form instructions for a plurality of histograms that each represent a different color component of the at least one image; and
create a separate look-up table for each of the plurality of histograms.

16. The device of claim 1, wherein stretch the predetermined amount of non-zero image pixel data values comprises:
determine distance between at least one of: (1) absolute nonzero maximum value and a Pw value, and (2) absolute nonzero minimum value and a Pd value, wherein if in (1) the distance is greater than a first predetermined limit, then the Pw value is determined to be upper end of the histogram and wherein if in (2) the distance is greater than a second predetermined limit, then the Pd value is determined to be lower end of the histogram.

17. A method comprising:
computing, by a processor, mean values that include a mean, a hi-mean, and a low-mean from luminance component values from a histogram of image pixel data;
locating, by the processor, a predetermined amount of nonzero pixel values from the component values, wherein determining the location of the nonzero pixel values is initiated at about the mean of the histogram and continues along the x-axis in a first direction to reach a Pw value and along a second value to reach a Pd value;
computing, by the processor, an overall stretching function on the predetermined amount of nonzero pixel values, wherein the stretching function is conducted over a dynamic range and correcting the mean values to create a stretched histogram having a stretched mean, a stretched hi-mean, and a stretched low-mean;
adjusting, by the processor, the stretched mean by a predetermined amount towards the center of the dynamic range to create a corrected stretched mean;
utilizing, by the processor, predetermined ratios between the corrected stretched mean and the ends of the dynamic range, adjusting the stretched high mean to get a corrected stretched high mean and adjusting the stretched low mean to obtain a corrected stretched low mean;
forming, by the processor, a piecewise linear mapping function that maps the corrected stretched low mean to target low mean values and the corrected stretched high mean to target high mean values; and
computing, by the processor, gains of the piecewise linear function and reshaping the slope so that all of the gains computed are between predetermined minimum and maximum limits;
wherein adjusting the stretched high mean to get a corrected stretched high mean and adjusting the stretched low mean to obtain a corrected stretched low mean comprises:
determining distance between at least one of: (1) absolute nonzero maximum value and the Pw value, and (2) absolute nonzero minimum value and the Pd value, wherein if in (1) the distance is greater than a first predetermined limit, then Pw is determined to be upper end of the histogram and wherein if in (2) the distance is greater than a second predetermined limit, then Pd is determined to be lower end of the histogram.

18. The method of claim 17, further comprising:
determining whether to restrict the dynamic range according to a predefined limit.

19. The method of claim 17, wherein adjusting the stretched high mean to get a corrected stretched high mean and adjusting the stretched low mean to obtain a corrected stretched low mean comprises:
adjusting the stretched low mean by adding x% of the difference between the corrected stretched mean and the stretched low mean to determine the corrected stretched low mean, wherein x is a predetermined value; and
adjusting the stretched high mean by subtracting x% of the difference between the stretched high mean and the corrected stretched mean to determine the corrected stretched high mean, wherein x is a predetermined value.

20. The method of claim 17, further comprising:
creating a stretching look-up table of the image pixel data values.

21. The method of claim 20, further comprising:
processing at least one image according to the look up table.

22. The method of claim 20, wherein at least one component comprises luminance estimate data, further comprising:
computing a plurality of different color components with the stretching look-up table.

23. The method of claim 17, the method further comprising:
creating a saturation gain look-up table.

24. The method of claim 23, wherein image pixel data comprises image pixel data from a Y component of an YUV image and the saturation look-up table is corrected according to a process performed on a device that computes the gain according to the equation: Gain=0.7*StretchedY/Y+0.3, and corrects the U and V components according to the equations: Ucorrected=Gain*U, and Vcorrected=Gain*V.

25. The method of claim 17, wherein at least one component of the image pixel data is derived from a color component format, the method further comprising:
repeating at least the computing an overall stretching function, adjusting, and utilizing instructions for a plurality of histograms that each represent a different color component of the at least one image; and
creating a separate look-up table for each of the plurality of histograms.

26. A non-transitory computer readable medium having computer-executable instructions that when executed by a processor cause a device to perform the method of:
stretch a histogram comprising values for at least one component of an image configured to form a stretched histogram across a dynamic range having a stretched mean that is further adjusted towards the center of the dynamic range to get a corrected stretched mean;
based upon the corrected stretched mean, determine a corrected stretched low mean and a corrected stretched high mean;
form a piecewise linear mapping function that maps the corrected stretched low mean to target low mean values and the corrected stretched high mean to target high mean values, wherein the mapping function is configured to allow the construction of a look-up table for performing contrast optimization of the image; and
restrict the dynamic range of the histogram to be stretched according to a predefined limit, wherein restricting the dynamic range further comprises:
determine distance between at least one of: (1) absolute nonzero maximum value and a Pw value, and (2) absolute nonzero minimum value and a Pd value, wherein if in (1) the distance is greater than a first predetermined limit, then Pw is determined to be upper end of the histogram and wherein if in (2) the distance is greater than a second predetermined limit, then Pd is determined to be lower end of the histogram.

27. The computer readable medium of claim 26, wherein the image is captured with a camera that is integrated with a device.

28. The computer readable medium of claim 26, further comprising computer-executable instructions that when executed by the processor in the device, cause the device to further perform:
process at least one image according to the look-up table.

29. The computer readable medium of claim 28, further comprising computer-executable instructions that when executed by the processor in the device, cause the device to further perform:
create a saturation gain look-up table.

30. The computer readable medium of claim 29, wherein image pixel data comprises image pixel data from the Y component of a YUV image and wherein the saturation look-up table is corrected according to a process performed that computes gain according to the equation: Gain=0.7*StretchedY/Y+0.3, and corrects the U and V components according to the equations: Ucorrected=Gain*U, and Vcorrected=Gain*V.

31. The computer readable medium of claim 28, wherein the at least one component comprises luminance estimate data, the computer-executable instructions that when executed by the processor in the device, cause the device to further perform:
compute a plurality of different color components with the look-up table.

32. The computer readable medium of claim 26, wherein at least one component of the image pixel data is derived from a color component format, the computer-executable instructions that when executed by the processor in the device, cause the device to further perform:
repeat at least the determine, form, and restrict instructions to create a plurality of histograms that each represent a different color component of the image; and
create a separate look-up table for each of the plurality of histograms.

33. A device comprising:
a means for capturing at least one image;
a means for storing the at least one image on a computer readable medium within the device having computer-executable instructions that when executed by a processor in the device cause the device to perform:
retrieve, from the data for the captured image, a plurality of image pixel data values for at least one component of the image configured to form a histogram across a dynamic range having a plurality of mean values including a mean, a hi-mean, and a low-mean;
stretch a predetermined amount of non-zero image pixel data values of the histogram to obtain at least a stretched mean, a stretched hi-mean, and a stretched low-mean comprising determine distance between at least one of: (1) absolute nonzero maximum value and a Pw value, and (2) absolute nonzero minimum value and a Pd value, wherein if in (1) the distance is greater than a first predetermined limit, then the Pw value is determined to be upper end of the histogram and wherein if in (2) the distance is greater than a second predetermined limit, then the Pd value is determined to be lower end of the histogram;
adjust the stretched mean a towards the center of the dynamic range of the histogram to get a corrected stretched mean;
utilize predetermined ratios between the corrected stretched mean and the ends of the dynamic range, adjust the stretched high mean to get a corrected stretched high mean and adjust the stretched low mean to obtain a corrected stretched low mean;
form a piecewise linear mapping function that maps the corrected stretched low mean to target low mean values and the corrected stretched high mean to target high mean values; and
compute gains of the piecewise linear function and reshape slope so that all of the gains computed are between predetermined minimum and maximum limits.

34. The device of claim 33, wherein the computer-executable instructions that when executed by the processor in the device, cause the device to further perform:
create a stretching look-up table of the image pixel data values; and
process at least one image according to the look-up table.

* * * * *